July 24, 1962 B. STAHMER 3,045,949
POWER CONTROL MEANS FOR VERTICAL LIFT PROPELLER JET AIRCRAFT
Filed Oct. 4, 1956 3 Sheets-Sheet 1

INVENTOR.
Bernhardt Stahmer
BY

July 24, 1962
B. STAHMER
3,045,949
POWER CONTROL MEANS FOR VERTICAL LIFT PROPELLER JET AIRCRAFT
Filed Oct. 4, 1956
3 Sheets-Sheet 2
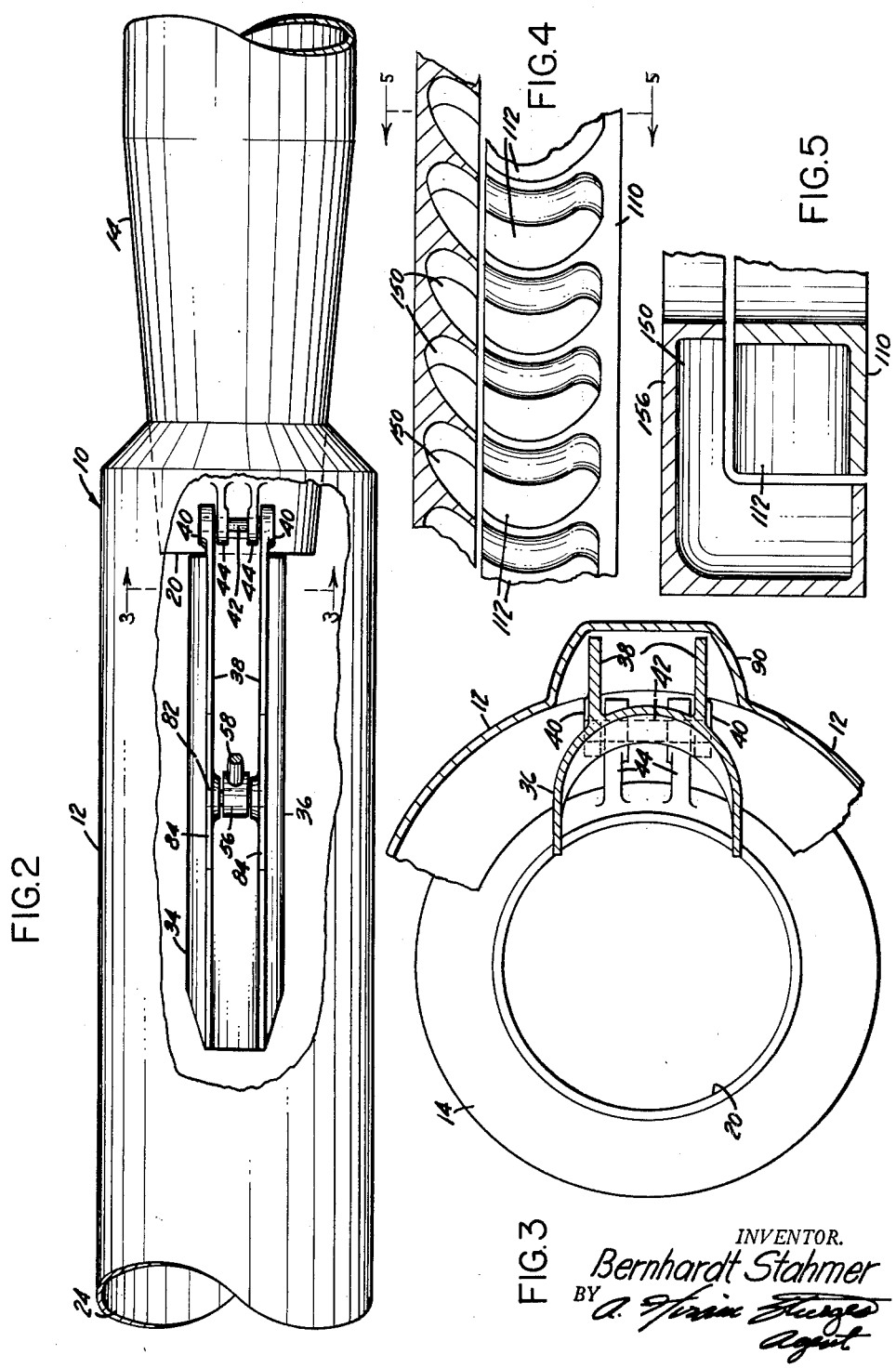
INVENTOR.
Bernhardt Stahmer

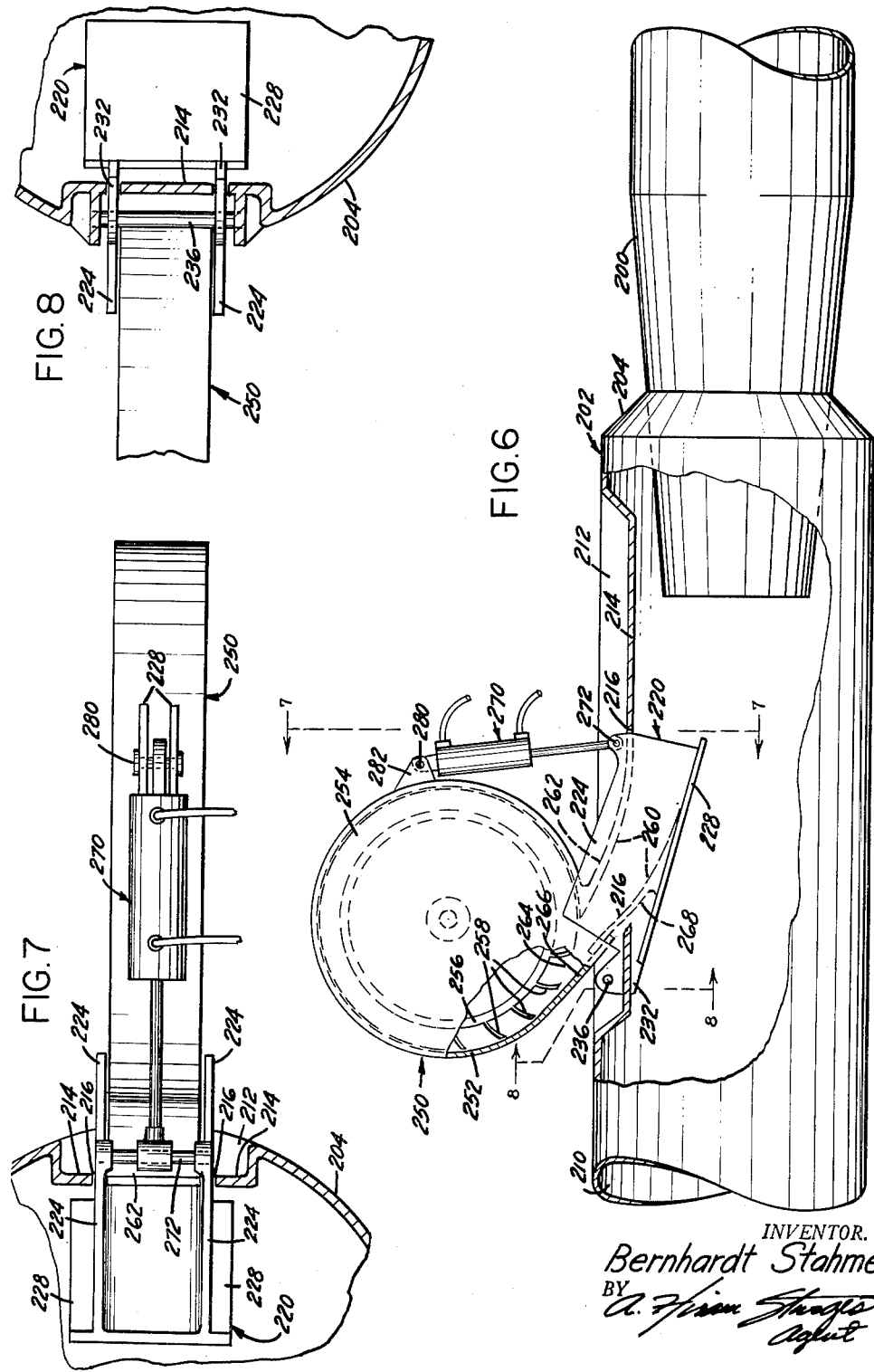

United States Patent Office 3,045,949
Patented July 24, 1962

3,045,949
POWER CONTROL MEANS FOR VERTICAL LIFT PROPELLER JET AIRCRAFT
Bernhardt Stahmer, 1509 Chicago St., Omaha, Nebr.
Filed Oct. 4, 1956, Ser. No. 613,922
4 Claims. (Cl. 244—12)

This invention relates to aircraft and more particularly to thrust diverting assembly for jet engines.

It is a particular object of this invention to provide an improvement on my previous disclosure and patent application entitled "Turbine Principle Helicopter-Type Blade for Aircraft," Serial No. 502,933, filed April 21, 1955, now Patent No. 2,973,166.

An object of my invention is to provide an outlet tube disposed in the path of the expanding gases of the jet engine and with a thrust diverting baffle adjustably mounted therein for diverting propulsive power into a turbine-principle helicopter-type blade or the like for rotation thereof.

An object of my invention is to provide a jet engine thrust diverter for jet engines of any type not limited only to use in aircraft.

An object of this invention is to provide a jet engine thrust diverter assembly in combination with a turbine principle helicopter-type blade for aircraft wherein the turbine mechanism for the helicopter-type blade is provided with a housing having a plurality of recesses disposed opposite the turbine buckets for the most efficient use of the power in the expanding exhaust gases of the jet engine.

A further object is to provide improvements in a turbine principle helicopter-type blade assembly for aircraft for the more efficient use of the power applied thereto.

A further object is to provide a thrust diverter for using the force of the exhaust gases from a jet engine to drive other mechanical devices for which there are many uses both in air craft and other fields.

Other and further objects and advantages of the present invention will be apparent from the following detailed description, drawings and claims, the scope of the invention not being limited to the drawings themselves as the drawings are only for the purpose of illustrating a way in which the principles of this invention can be applied.

Other embodiments of the invention utilizing the same or equivalent principles may be used and structural changes may be made as desired by those skilled in the art without departing from the present invention and the purview of the appended claims.

In the drawings:

FIGURE 2 is an enlarged side elevation of only a rearward portion of the jet engine and a forward portion of the diverter housing attached thereto, the side wall of the housing being broken away to reveal the backside of the diverter baffle and mounting means therefor;

FIGURE 3 is an enlarged cross sectional view taken along the line 3—3 of FIGURE 2;

FIGURE 4 is a cross sectional view taken along the line 4—4 of FIGURE 1 shows the relation between the turbine buckets disposed about the rim of the helicopter blades and the reaction pockets recessed into the helicopter blade housing;

FIGURE 5 is a cross sectional view taken along the line 5—5 of FIGURE 4;

FIGURE 6 is a side elevation of a modified diverter assembly for use with units other than those mounted in aircraft;

FIGURE 7 is an enlarged detail view partly in cross section taken along the lines 7—7 of FIGURE 6; and FIGURE 8 is an enlarged detail view partly in cross section and with some parts broken away for clarity of illustration, taken along the line 8—8 of FIGURE 6.

Figure 1:
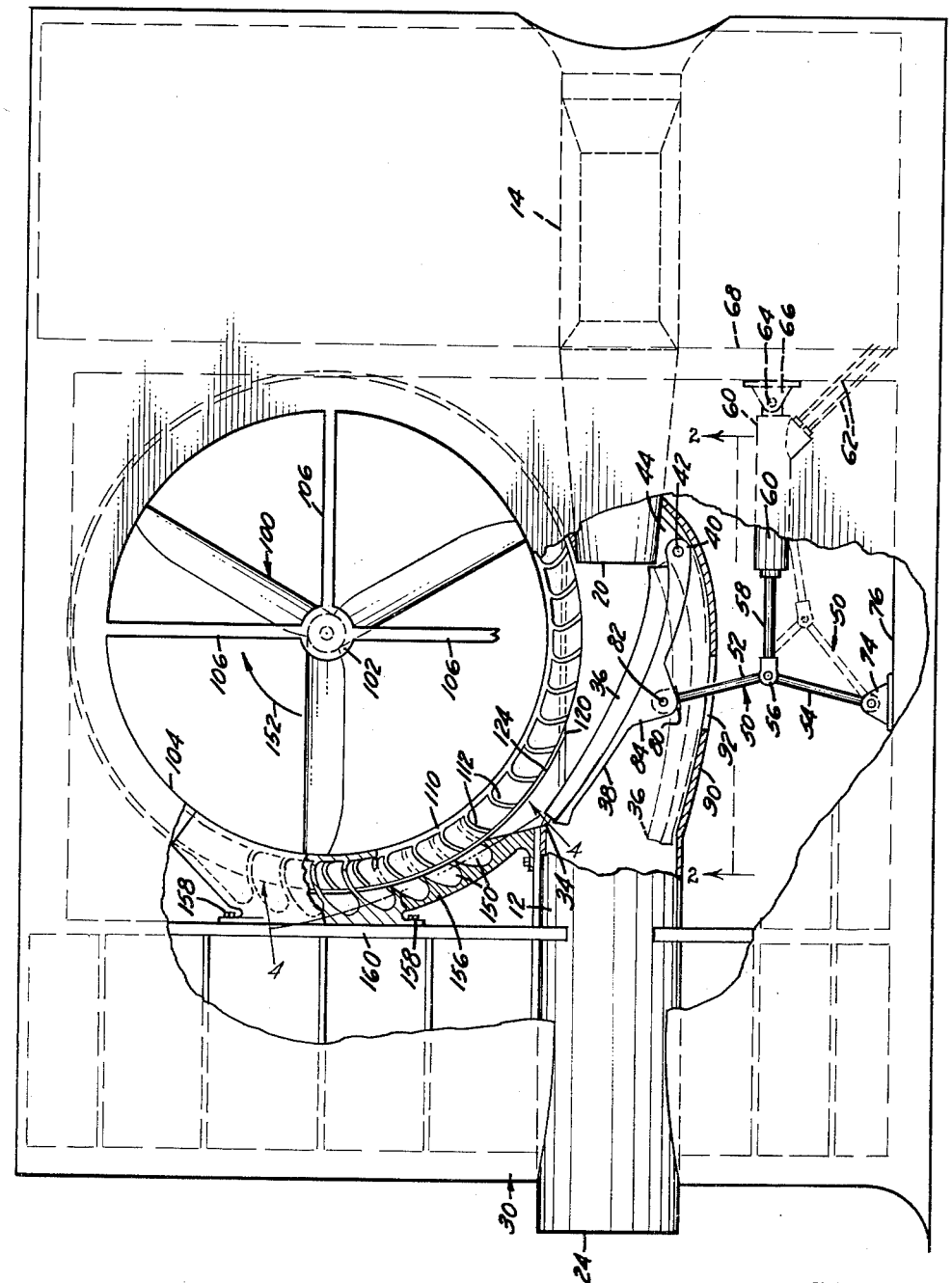
FIGURE 1 is a top plan view of the aircraft jet propulsion thrust diverter of my invention mounted in a wing section of an aircraft, parts being broken away and other parts shown in cross-section for convenience of illustration.

The thrust diverter assembly is generally indicated at 10 in FIGURES 1 and 2 and has an elongated housing 12 disposed in the path of exhaust gases from a jet engine 14 shown in both full and dotted lines at 14 and enclosed in an airplane wing 30. The housing 12 has one end connected to the jet engine housing 14 with a tight fit whereby all exhause gases leaving an exhaust port 20 of the jet engine are delivered into the housing 12.

The housing 12 has an outlet opening 24 at its opposite end for the escape of exhaust gases into the air whereby the exhaust gases can pass from the jet engine 14 through the housing 12 and be delivered to the air.

The jet engine 14 and the housing 12 can be mounted in a wing 30, a portion of which is shown in FIGURE 1, whereby the housing 12 is mounted into such a position that gases from its outlet opening 24 are delivered into the air to the rearward edge of the wing 30.

A diversion opening 34 is provided in the side of the housing 12 for passage of exhaust gases therethrough for a purpose later described.

A thrust diversion baffle 36 is movably mounted in the diversion housing 12 in any suitable manner for selectively diverting gases through the diversion opening 34 or else permitting the gases to pass freely from the jet engine 14 through the housing 12 and out through the outlet 24.

The thrust diversion baffle 36 is preferably pivotally mounted in the housing 12 and this can be done by providing supporting frame members 38 on the outer side of the baffle 36, the frame members 38 having ears 40 situated thereto and receiving a pivot pin 42 disposed extending through nibs 44 connected to the jet engine 14.

The pin 42 extends transversely to the elongated housing 12 and is disposed alongside the jet engine 14 whereby the baffle 36 is thereby mounted for swinging in an arc at the rearward end of the jet engine 14 from a position disposed alongside of the housing 12 and out of the main pathway of the gases from the jet engine 14 passing to the outlet 24 to a second and inner position disposed at an inclination to this pathway of the exhaust gases for diverting the exhaust gases outwardly through the diversion opening 34, and for a purpose later described.

Suitable means can be provided for control of the positioning of the diversion baffle 36 and this can be done through the use of a toggle assembly generally indicated at 50 in FIG. 1 comprising two linkages 52 and 54 each pivotally connected to a fitting 56 attached to the end of a piston rod 58 of a hydraulic jack for a cylinder 60 paritally shown in dotted lines in FIG. 1. Suitable hydraulic hoses 62 can extend to the jack cylinder 60 and it is desirable that the jack cylinder 60 be pivotally mounted as by means of a pin 64 and a mounting 66 to a suitably strong part 68 of the structure of an aircraft wing 30.

One of the linkages 54 can be pivotally secured to a mounting 74 which latter can be attached to a suitably strong part 76 of the aircraft wing 30 and the other linkage 52 of the toggle assembly can be attached to a pin bearing 80 which in turn is pivotally attached by means of a pin 82 to suitable spaced apart ears 84 attached to the frame members 38 of the baffle.

The construction is such that the hydraulic jack 60 can have its power multiplied by the toggle linkage assembly 50 whereby the maximum of power multiplication is attained at a time when the baffle 36 is in an inwardly disposed position for diverting the gases.

The housing 12 can be provided with a suitable outwardly extending portion 90 having a concave inner surface for receiving thereagainst baffle 36 so that it can be disposed out of the way when not in use as shown in the dotted line positions in FIG. 1.

An opening 92 can extend through the housing portion 90 to admit the toggle linkage 52.

It is to be understood that the drawing is to some extent diagrammatic and theoretical and when the device has its final engineering perfections certain other changes will be made such as means for closing the opening 92.

The baffle 36 is preferably provided with a concave inner side as best seen in FIG. 3 for more efficiently diverting gases through the diversion opening 34. It is desirable that the baffle 36 snugly be slidably fit into the diversion opening 34 at the innermost end of the baffle.

Referring to FIG. 1 a turbine principle helicopter-type propeller 100 is shown constructed in accordance with by earlier patent application above described. The propeller 100 can have a plurality of blades mounted on a hub 102 disposed above the propeller 100. The hub 102 is disposed above the center of a circular opening 104 through the wing 30 of the aircraft and the hub 102 is held in place by suitable supporting braces 106 attached thereto and extending to suitable other parts of the wing 30.

A rim 110 extends around the circumference of the circle defined by the blades of the propeller 100 and the rim 110 is attached to and supported by each blade of the propeller 100. Around the periphery of the rim 110 are certain outwardly extending turbine pockets 112. The rim 110 and pockets 112 rotate in a suitable circular recess 120 in the wing 30.

The recess has an outer wall 124 closely spaced from the outer periphery of the turbine pockets 112 for a snug fit with respect thereto around the periphery of the turbine pocket configuration.

It will be seen that the above described diversion opening 34 in the housing 12 is disposed adjacent the turbine pockets 112 and opens on to the recess 120 for passage of gases to the turbine pockets 112.

As thus described when the diversion baffle 36 is in an inner position as shown in full lines in FIG. 1 the propeller 110 will be caused to rotate for providing the aircraft with a vertical upward motion while those exhaust gases which pass around the baffle 36 and out through the outlet 24 provide the aircraft with a simultaneous forward motion.

In accordance with an improvement of the present invention reaction pockets are provided at 150 in many spaced apart places around the periphery of the turbine pocket configuration and especially adjacent the first 45° portion thereof in the position immediately forwardly in the direction of rotation from the diversion opening 34.

The propeller and turbine assembly is adapted to rotate in a counter-clockwise direction as best seen at 152 in FIG. 1.

The reaction pockets are formed in a suitable member 156 disposed opposite the turbine pocket configuration. As indicated in FIG. 1 the reaction pockets can extend not only around the outer end of the turbine pockets but can also extend around the top thereof as best seen in FIG. 5 in which the member 156 has an upper portion disposed above a turbine pocket 150.

It will be seen that the pockets 150 are provided with side walls which are inclinedly disposed with respect to a radius of the turbine propeller assembly theoretically passing through the respective turbine pocket, inclining with respect thereto rearwardly and outwardly with further respect to the direction of rotation of the turbine propeller assembly for making use of the thrust of exhause gases applied to the turbine propeller assembly.

Referring to FIG. 1, it will be seen that the reaction pockets 150 are progressively of greater depth the farther they are disposed away from the diversion opening 34 to accommodate the expansion of the gases.

The reaction pocket member 156 can be suitably secured to the wing 30 as by means of bolts 158 attaching it to a suitably strong part 160 of the wing 70.

Referring to FIG. 6 a modification of the invention is there shown. In FIG. 6 a jet engine 200 has a thrust diverting assembly generally indicated at 202 attached thereto, the latter has a housing 204 which is attached to the engine 200 with a tight fit whereby the exhaust gases normally pass through the housing 204 and out through an outlet end 210.

The housing 204 has a recess in its upperside as indicated at 212 which is formed by the provision of having a side portion of the housing 204 offset inwardly with respect to the remainder thereof, the inset portion of the housing being indicated at 214.

A suitable diversion opening 216 is provided through the inset housing portion 214 and is adapted to receive therethrough a diversion baffle 220.

The diversion opening 216 is preferably of rectangular shape and the diversion baffle 220 preferably has two parallel flat side blade portions 224 which latter are spaced apart sufficiently to define the sides of a diversion baffle.

The diversion baffle 220 further has an innermost plate portion 228 which is disposed inclinedly with respect to the inset flat housing portion 214 as best seen in FIG. 6 at times when the baffle 220 is in diversion position.

The sides 224 of the baffle 220 are provided with protruding portions 232 which are disposed on the opposite end of the sides 224 from the engine 200. The portions 232 are spaced apart and are suitably pivotally secured to the housing 204 such as by means of a pin 236 disposed transversely to the elongated housing 204 and parallel to the flat inset housing portion 214.

As thus described it will be seen that when the baffle 220 is in an outer position the inner plate portion 228 will fit snugly against the flat inner side of the inset housing portion 214, thus sealing the diversion opening 216 because the plate 228 extends beyond the side portions 224 sufficiently overlapping the diversion opening 216.

A turbine assembly generally indicated at 250 is disposed above the baffle 220 and has a housing portion 252 of substantially circular periphery closed in at the sides by flat parallel side housing portions 254.

Inside the housing 252 is a turbine wheel 256 having turbine blades 258.

The housing 252 has an outwardly extending scoop 260 comprising a top wall 262 which latter connects to the flat housing portion 214 above the opening 216 and a bottom wall 266 extending outwardly to the rearward end of the opening 216.

A curved plate 268 has its lower end secured to the top of the plate 228 of the baffle 220 and extends upwardly and rearwardly to and overlaps the lower end of the wall 266.

The walls 262, 266 and the plate 268 comprise the scoop 260, the walls being spaced apart with respect to each other whereby exhaust gases can pass between the walls of the scoop 260 and strike the turbine blades 258 of the turbine wheel 256 passing through an opening 264 in the housing 250 disposed between upper and lower walls and scoop portion 260 of the housing 250.

Suitable means such as a hydraulic jack 270 can be provided for controlling the position of the baffle 220 one end of the jack 270 can be pivotally situated at 272 to the walls 224 of the baffle assembly 220 and the other end of the jack 270 can be pivotally attached at 280 to ears 282 attached to the housing 250.

From the foregoing description, it is thought to be obvious that an aircraft jet propulsion thrust diverter constructed in accordance with my invention is particularly well adapted for use, by reason of the convenience and facility with which it may be assembled and operated, and it will also be obvious that my invention is susceptible of some change and modification without departing from the principles and spirit thereof, and for this reason I do not wish to be understood as limiting myself to the precise arrangement and formation of the several parts herein shown in carrying out my invention in practice, except as claimed.

I claim:

1. A jet aircraft having a turbine-driven horizontally rotating propeller assembly mounted in a wing thereof, said assembly comprising a propeller, a rim around the propeller and a circular row of spaced turbine buckets disposed around and attached to said rim, a jet engine mounted in said aircraft, an elongated exhaust housing disposed in the path of exhaust gases from the jet engine of said aircraft, said housing having one end connected to said jet engine for receiving gases therein, said housing having an outlet opening at its other end disposed directly behind said jet engine for direct rearward unhindered thrust of said exhaust gases when it is desired for said aircraft to travel forwardly at maximum speed, said housing being disposed to one side of said propeller assembly, and said housing having a diversion opening in a side thereof for delivering the exhaust gas horizontally to said propeller assembly, a diversion baffle movably mounted in said housing adjacent said diversion opening, and means for controllably positioning said diversion baffle selectively in positions for diverting selected amounts of exhaust gases through said diversion opening to said turbine-driven propeller assembly, a housing surrounding and rotatably receiving said turbine buckets, said propeller housing being disposed horizontally to one side of said exhaust housing, said propeller housing having an opening therein disposed between and in communication with forward diversion opening in said exhaust housing, the position of said openings in said housing and the position of said baffle when said baffle is in a diversion position being such as to direct exhaust gases to said turbine buckets tangentially of said row of turbine buckets at a maximum deflection substantially less than 90° from the normal flow rearwardly from said exhaust housing being disposed rearwardly of said jet engine.

2. The combination of claim 1 in which said housing has a pocket in a side thereof opposite to said diversion opening and of a shape complementary to the shape of the outer side of said baffle whereby said baffle is substantially received in said pocket when not used for diversion of thrust.

3. The combination of claim 1 in which said baffle is curved in a direction generally transverse to said elongated housing for more efficiently directing thrust into said diversion opening.

4. The combination described in claim 1 in which said baffle is swingably mounted for pivoting about a vertical axis and in which said means for controllably positioning said diversion baffle acts against said baffle at a position spaced from its axis of pivoting for great leverage against the power thrust of exhaust gases.

References Cited in the file of this patent

UNITED STATES PATENTS

| 2,501,078 | Newcomb | Mar. 21, 1950 |
| 2,510,506 | Lindhagen et al. | June 6, 1950 |
| 2,637,164 | Robson et al. | May 5, 1953 |
| 2,667,185 | Beavers | Jan. 26, 1954 |
| 2,728,354 | Shutts | Dec. 27, 1955 |
| 2,774,554 | Ashwood et al. | Dec. 18, 1956 |
| 2,899,149 | Breguet | Aug. 11, 1959 |

FOREIGN PATENTS

| 1,068,404 | France | Feb. 3, 1954 |
| 580,995 | Great Britain | Sept. 26, 1946 |
| 733,931 | Great Britain | July 20, 1955 |